United States Patent [19]
Gildert et al.

[11] Patent Number: 6,083,378
[45] Date of Patent: Jul. 4, 2000

[54] PROCESS FOR THE SIMULTANEOUS TREATMENT AND FRACTIONATION OF LIGHT NAPHTHA HYDROCARBON STREAMS

[75] Inventors: Gary R. Gildert; Willibrord A. Groten; Hugh M. Putman, all of Houston, Tex.

[73] Assignee: Catalytic Distillation Technologies, Pasadena, Tex.

[21] Appl. No.: 09/150,573

[22] Filed: Sep. 10, 1998

[51] Int. Cl.⁷ .................................................... C10G 45/02
[52] U.S. Cl. ............................................. 208/209; 208/213
[58] Field of Search ..................................... 208/213, 209

[56] References Cited

U.S. PATENT DOCUMENTS

| | | | |
|---|---|---|---|
| 4,731,229 | 3/1988 | Sperandio | 422/188 |
| 5,073,236 | 12/1991 | Gelbein et al. | 203/29 |
| 5,431,890 | 7/1995 | Crossland et al. | 422/211 |
| 5,510,568 | 4/1996 | Hearn | 585/834 |
| 5,595,634 | 1/1997 | Hearn et al. | 203/29 |
| 5,597,476 | 1/1997 | Hearn et al. | 208/208 |
| 5,629,451 | 5/1997 | Hearn et al. | 564/490 |
| 5,779,883 | 7/1998 | Hearn et al. | 208/213 |

*Primary Examiner*—Helane E. Myers
*Attorney, Agent, or Firm*—Kenneth H Johnson

[57] ABSTRACT

A process for concurrently fractionating and hydrotreating of a full range naphtha stream. The full boiling range naphtha stream is subjected to simultaneous hydrodesulfurization and splitting into a light boiling range naphtha and a heavy boiling range naphtha. The two boiling range naphthas are treated separately according to the amount of sulfur in each cut and the end use of each fraction.

14 Claims, 11 Drawing Sheets

PROCESS FOR THE SIMULTANEOUS TREATMENT AND FRACTIONATION OF LIGHT NAPHTHA HYDROCARBON STREAMS

BACKGROUND OF THE INVENTION

1. Field of the Invention

The present invention relates to a process for concurrently fractionating and hydrotreating a full range naphtha stream. More particularly the full boiling range naphtha stream is subjected to simultaneous hydrodesulfurization and splitting into a light boiling range naphtha and a heavy boiling range naphtha. The two boiling range naphthas are treated separately according to the amount of sulfur in each cut and the end use of each fraction.

2. Related Information

Petroleum distillate streams contain a variety of organic chemical components. Generally the streams are defined by their boiling ranges which determine the compositions. The processing of the streams also affects the composition. For instance, products from either catalytic cracking or thermal cracking processes contain high concentrations of olefinic materials as well as saturated (alkanes) materials and poly-unsaturated materials (diolefins). Additionally, these components may be any of the various isomers of the compounds.

The composition of untreated naphtha as it comes from the crude still, or straight run naphtha, is primarily influenced by the crude source. Naphthas from paraffinic crude sources have more saturated straight chain or cyclic compounds. As a general rule most of the "sweet" (low sulfur) crudes and naphthas are paraffinic. The naphthenic crudes contain more unsaturates and cyclic and polycyclic compounds. The higher sulfur content crudes tend to be naphthenic. Treatment of the different straight run naphthas may be slightly different depending upon their composition due to crude source.

Reformed naphtha or reformate generally requires no further treatment except perhaps distillation or solvent extraction for valuable aromatic product removal. Reformed naphthas have essentially no sulfur contaminants due to the severity of their pretreatment for the process and the process itself.

Cracked naphtha as it comes from the catalytic cracker has a relatively high octane number as a result of the olefinic and aromatic compounds contained therein. In some cases this fraction may contribute as much as half of the gasoline in the refinery pool together with a significant portion of the octane.

Catalytically cracked naphtha gasoline boiling range material) currently forms a significant part ($\approx \frac{1}{3}$) of the gasoline product pool in the United States and it provides the largest portion of the sulfur. The sulfur impurities may require removal, usually by hydrotreating, in order to comply with product specifications or to ensure compliance with environmental regulations.

The most common method of removal of the sulfur compounds is by hydrodesulfurization (HDS) in which the petroleum distillate is passed over a solid particulate catalyst comprising a hydrogenation metal supported on an alumina base. Additionally copious quantities of hydrogen are included in the feed. The following equations illustrate the reactions in a typical HDS unit:

| |
|---|
| (1) $RSH + H_2 \rightarrow RH + H_2S$ |
| (2) $RCl + H_2 \rightarrow RH + HCl$ |
| (3) $2RN + 4H_2 \rightarrow RH + NH_3$ |
| (4) $ROOH + 2H_2 \rightarrow RH + H_2O$ |

Typical operating conditions for the HDS reactions are:

| | |
|---|---|
| Temperature, ° F. | 600–780 |
| Pressure, psig | 600–3000 |
| $H_2$ recycle rate, SCF/bbl | 1500–3000 |
| Fresh $H_2$ makeup, SCF/bbl | 700–1000 |

After the hydrotreating is complete the product may be fractionated or simply flashed to release the hydrogen sulfide and collect the now desulfurized naphtha.

In addition to supplying high octane blending components the cracked naphthas are often used as sources of olefins in other processes such as etherifications. The conditions of hydrotreating of the naphtha fraction to remove sulfur will also saturate some of the olefinic compounds in the fraction reducing the octane and causing a loss of source olefins.

Various proposals have been made for removing sulfur while retaining the more desirable olefins. Since the olefins in the cracked naphtha are mainly in the low boiling fraction of these naphthas and the sulfur containing impurities tend to be concentrated in the high boiling fraction the most common solution has been prefractionation prior to hydrotreating. The prefractionation produces a light boiling range naphtha which boils in the range of $C_5$ to about 250° F. and a heavy boiling range naphtha which boils in the range of from about 250–475° F.

The predominant light or lower boiling sulfur compounds are mercaptans while the heavier or higher boiling compounds are thiophenes and other heterocyclic compounds. The separation by fractionation alone will not remove the mercaptans. However, in the past the mercaptans have been removed by oxidative processes involving caustic washing. A combination oxidative removal of the mercaptans followed by fractionation and hydrotreating of the heavier fraction is disclosed in U.S. Pat. No. 5,320,742. In the oxidative removal of the mercaptans the mercaptans are converted to the corresponding disulfides.

In addition to treating the lighter portion of the naphtha to remove the mercaptans it traditionally has been used as feed to a catalytic reforming unit to increase the octane number if necessary. Also the lighter fraction may be subjected to further separation to remove the valuable $C_5$ olefins (amylenes) which are useful in preparing ethers.

It is an advantage of the present invention that the sulfur may be removed from the light olefin portion of the stream to a heavier portion of the stream without any substantial loss of olefins. Substantially all of the sulfur in the heavier portion is converted to $H_2S$ by hydrodesulfurization and easily distilled away from the hydrocarbons.

SUMMARY OF THE INVENTION

Briefly the present invention utilizes a naphtha splitter as a distillation column reactor to treat a portion or all of the naphtha to remove the organic sulfur compounds contained therein. The catalyst is placed in the distillation column reactor such that the selected portion of the naphtha is contacted with the catalyst and treated. The catalyst may be placed in the rectification section to treat the lighter boiling range components only, in the stripping section to treat the heavier boiling range components only, or throughout the column to widely treat the naphtha. In addition the distillation column reactor may be combined with standard single pass fixed bed reactors or another distillation column reactor to fine tune the treatment.

As used herein the term "distillation column reactor" means a distillation column which also contains catalyst such that reaction and distillation are going on concurrently in the column. In a preferred embodiment the catalyst is prepared as a distillation structure and serves as both the catalyst and distillation structure.

DETAILED DESCRIPTION OF THE INVENTION

The feed to the process comprises a sulfur-containing petroleum fraction which boils in the gasoline boiling range. Feeds of this type include light naphthas having a boiling range of about $C_5$ to 330° F. and full range naphthas having a boiling range of $C_5$ to 420° F. Generally the process is useful on the naphtha boiling range material from catalytic cracker products because they contain the desired olefins and unwanted sulfur compounds. Straight run naphthas have very little olefinic material, and unless the crude source is "sour", very little sulfur.

The sulfur content of the catalytically cracked fractions will depend upon the sulfur content of the feed to the cracker as well as the boiling range of the selected fraction used as feed to the process. Lighter fractions will have lower sulfur contents than higher boiling fractions. The front end of the naphtha contains most of the high octane olefins but relatively little of the sulfur. The sulfur components in the front end are mainly mercaptans and typical of those compounds are: methyl mercaptan (b.p. 43° F.), ethyl mercaptan (b.p. 99° F.), n-propyl mercaptan (b.p. 154° F.), iso-propyl mercaptan (b.p. 135–140° F.), iso-butyl mercaptan (b.p. 190° F.), tert-butyl mercaptan (b.p. 147° F.), n-butyl mercaptan (b.p. 208° F.), sec-butyl mercaptan (b.p. 203° F.), iso-amyl mercaptan (b.p. 250° F.), n-amyl mercaptan (b.p. 259° F.), α-methylbutyl mercaptan (b.p. 234° F.), α-ethylpropyl mercaptan (b.p. 293° F.), n-hexyl mercaptan (b.p. 304° F.), 2-mercapto hexane (b.p. 284° F.), and 3-mercapto hexane (b.p. 135° F.). Typical sulfur compounds found in the heavier boiling fraction include the heavier mercaptans, thiophenes sulfides and disulfides.

The reaction of organic sulfur compounds in a refinery stream with hydrogen over a catalyst to form $H_2S$ is typically called hydrodesulfurization. Hydrotreating is a broader term which includes saturation of olefins and aromatics and the reaction of organic nitrogen compounds to form ammonia. However hydrodesulfurization is included and is sometimes simply referred to as hydrotreating.

Catalyst which are useful for the hydrodesulfurization reaction include Group VIII metals such as cobalt, nickel, palladium, alone or in combination with other metals such as molybdenum or tungsten on a suitable support which may be alumina, silica-alumina, titania-zirconia or the like. Normally the metals are provided as the oxides of the metals supported on extrudates or spheres and as such are not generally useful as distillation structures.

The catalysts contain components from Group V, VIB, VIII metals of the Periodic Table or mixtures thereof. The use of the distillation system reduces the deactivation and provides for longer runs than the fixed bed hydrogenation units of the prior art. The Group VIII metal provides increased overall average activity. Catalysts containing a Group VIB metal such as molybdenum and a Group VIII such as cobalt or nickel are preferred. Catalysts suitable for the hydrodesulfurization reaction include cobalt-molybdenum, nickel-molybdenum and nickel-tungsten. The metals are generally present as oxides supported on a neutral base such as alumina, silica-alumina or the like. The metals are reduced to the sulfide either in use or prior to use by exposure to sulfur compound containing streams. The catalyst may also catalyze the hydrogenation of the olefins and polyolefins contained within the light cracked naphtha and to a lesser degree the isomerization of some of the mono-olefins. The hydrogenation, especially of the mono-olefins in the lighter fraction may not be desirable.

The properties of a typical hydrodesulfurization catalyst are shown in Table I below.

TABLE I

| Manufacture | Criterion Catalyst Co. |
|---|---|
| Designation | C-448 |
| Form | Tri-lobe Extrudate |
| Nominal size | 1.2 mm diameter |
| Metal, Wt. % | |
| Cobalt | 2–5% |
| Molybdenum | 5–20% |
| Support | Alumina |

The catalyst typically is in the form of extrudates having a diameter of $\frac{1}{8}$, $\frac{1}{16}$ or $\frac{1}{32}$ inches and an L/D of 1.5 to 10. The catalyst also may be in the form of spheres having the same diameters. They may be directly loaded into standard single pass fixed bed reactors which include supports and reactant distribution structures. However, in their regular form they form too compact a mass and must then be prepared in the form of a catalytic distillation structure. The catalytic distillation structure must be able to function as catalyst and as mass transfer medium. The catalyst must be suitably supported and spaced within the column to act as a catalytic distillation structure. In a preferred embodiment the catalyst is contained in a woven wire mesh structure as disclosed in U.S. Pat. No. 5,266,546, which is hereby incorporated by reference. More preferably the catalyst is contained in a plurality of wire mesh tubes closed at either end and laid across a sheet of wire mesh fabric such as demister wire. The sheet and tubes are then rolled into a bale for loading into the distillation column reactor. This embodiment is described in U.S. Pat. No. 5,431,890 which is hereby incorporated by reference. Other catalytic distillation structures useful for this purpose are disclosed in U.S. Pat. Nos. 4,731,229, 5,073,236, 5,431,890 and 5,730,843 which are also incorporated by reference.

Reaction conditions for sulfur removal only in a standard single pass fixed bed reactor are in the range of 500–700° F. at pressures of between 400–1000 psig. Residence times expressed as liquid hourly space velocity are generally typically between 1.0 and 10. The naphtha in the single pass fixed bed reaction may be in the liquid phase or gaseous phase depending on the temperature and pressure, with total pressure and hydrogen gas rate adjusted to attain hydrogen partial pressures in the 100–700 psia range. The operation of the single pass fixed bed hydrodesulfurization is otherwise well known in the art.

The conditions suitable for the desulfurization of naphtha in a distillation column reactor are very different than those in a standard trickle bed reactor, especially with regard to total pressure and hydrogen partial pressure. Typical conditions in a reaction distillation zone of a naphtha hydrodesulfurization distillation column reactor are:

| Temperature | 450–700° F. |
|---|---|
| Total Pressure | 75–300 psig |
| $H_2$ partial pressure | 6–75 psia |

-continued

| LHSV of naphtha | about 1–5 |
|---|---|
| $H_2$ rate | 10–1000 SCFB |

The operation of the distillation column reactor results in both a liquid and vapor phase within the distillation reaction zone. A considerable portion of the vapor is hydrogen while a portion is vaporous hydrocarbon from the petroleum fraction. Actual separation may only be a secondary consideration.

Without limiting the scope of the invention it is proposed that the mechanism that produces the effectiveness of the present process is the condensation of a portion of the vapors in the reaction system, which occludes sufficient hydrogen in the condensed liquid to obtain the requisite intimate contact between the hydrogen and the sulfur compounds in the presence of the catalyst to result in their hydrogenation. In particular, sulfur species concentrate in the liquid while the olefins and $H_2S$ concentrate in the vapor allowing for high conversion of the sulfur compounds with low conversion of the olefin species.

The result of the operation of the process in the distillation column reactor is that lower hydrogen partial pressures (and thus lower total pressures) may be used. As in any distillation there is a temperature gradient within the distillation column reactor. The temperature at the lower end of the column contains higher boiling material and thus is at a higher temperature than the upper end of the column. The lower boiling fraction, which contains more easily removable sulfur compounds, is subjected to lower temperatures at the top of the column which provides for greater selectivity, that is, less hydrocracking or saturation of desirable olefinic compounds. The higher boiling portion is subjected to higher temperatures in the lower end of the distillation column reactor to crack open the sulfur containing ring compounds and hydrogenate the sulfur.

It is believed that in the present distillation column reaction is a benefit first, because the reaction is occurring concurrently with distillation, the initial reaction products and other stream components are removed from the reaction zone as quickly as possible reducing the likelihood of side reactions. Second, because all the components are boiling the temperature of reaction is controlled by the boiling point of the mixture at the system pressure. The heat of reaction simply creates more boil up, but no increase in temperature at a given pressure. As a result, a great deal of control over the rate of reaction and distribution of products can be achieved by regulating the system pressure. A further benefit that this reaction may gain from distillation column reactions is the washing effect that the internal reflux provides to the catalyst thereby reducing polymer build up and coking.

Finally, the upward flowing hydrogen acts as a stripping agent to help remove the $H_2S$ which is produced in the distillation reaction zone.

The attached FIGS. show various processing schemes for obtaining particular results. The same elements have been given the same designations in the figures. It should be appreciated that rearrangement of the elements in the various embodiments is all directed to the separation of naphthas and the reduction in organic sulfur compounds.

Figure 1:
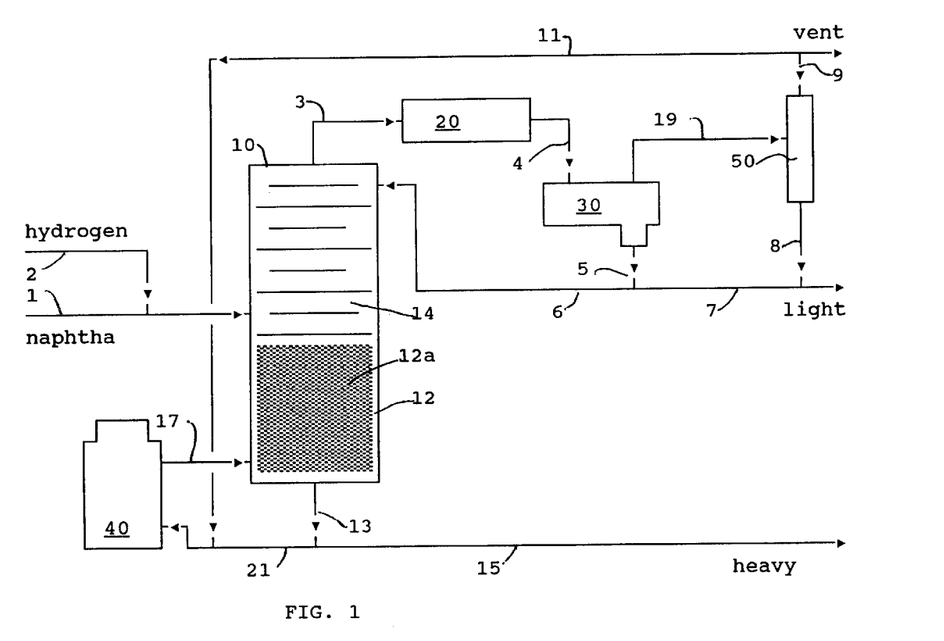
FIG. 1 is a simplified flow diagram of one embodiment of the invention having one catalyst bed in a distillation column/naphtha splitter which is used to treat the heavier components only.

In FIG. 1 the catalyst 12a is loaded into only the stripping section 12 of a naphtha splitter 10 configured as a distillation column reactor. The naphtha feed is into the distillation column reactor 10 above the stripping section via flow line 1 and combined with hydrogen from flow line 2. The rectification section 14 is left void of catalyst to prevent the lighter components from being subjected to hydrodesulfurization catalyst and prevent the unwanted saturation of the olefins. The light naphtha is boiled up into the rectification section 14 and removed along with unreacted hydrogen and $H_2S$ as overheads via flow line 3. The light naphtha is condensed in condenser 20 and separated from the hydrogen and $H_2S$ and other lights in receiver/separator 30. The uncondensed lights are removed from the separator 30 via flow line 19 and taken to knock out pot 50 where any liquid (entrained or later condensed) are removed via flow line 8 and combined with light naphtha product in flow line 7. The liquid from the separator is removed via flow line 5 with a portion being returned to the distillation column reactor as reflux via flow line 6. The naphtha product is removed via flow line 7. The heavy naphtha fraction is subjected to hydrodesulfurization by the catalyst 12a in the stripping section and is removed as bottoms via flow line 13. A portion of the bottoms is circulated through fired heater reboiler 40 via flow lines 21 and 17. The heavy naphtha product is removed via flow line 15. Most of the gas from the knock out pot 50 is recompressed and recycled to the fired reboiler 40 via flow line 11. A vent may be provided to prevent build up of inert hydrocarbons normally present in refinery hydrogen streams and to remove some $H_2S$. The preferred operating conditions and results for the distillation column reactor of FIG. 1 are as follows:

| Pressure | 100–300 psig |
| --- | --- |
| $H_2$ rate | 30–1000 scfh |
| $H_2$ partial pres. | 1–60 psi |
| LHSV | 0.2–5.0 |
| % HDS | 98 |

Figure 2:
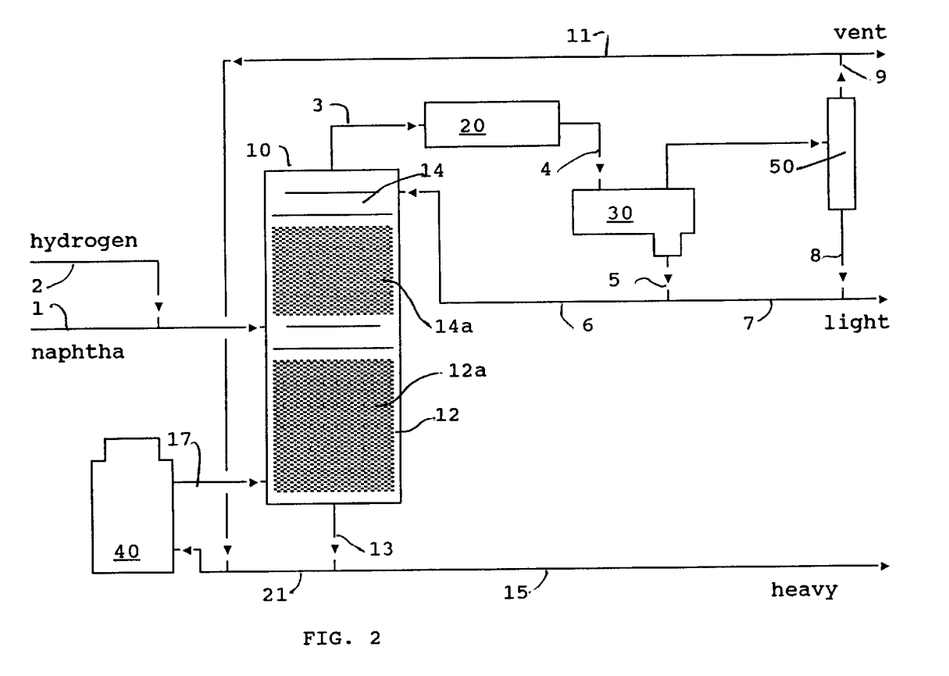
FIG. 2 is a simplified flow diagram of a variation of the embodiment of FIG. 1 having two catalyst beds in a distillation column/naphtha splitter which is used to treat the full boiling range of the naphtha.

A second embodiment is shown in FIG. 2. This embodiment differs from that of FIG. 1 only by including a catalyst bed 14a in the rectification section 14. The remaining description is identical to FIG. 1. The catalyst in the upper bed may be selected to be less active so that the mono-olefins are not hydrogenated or may the same as the bottom and be used to hydrogenates those olefins if present. Preferred operating conditions and results for the distillation column reactor of FIG. 2 are as follows:

| Pressure | 100–300 psig |
| --- | --- |
| $H_2$ rate | 30–1000 scfh |
| $H_2$ partial press. | 1–60 psi |
| % HDS | 50–97 |
| WHSV | 0.2–5.0 |

Figure 3:
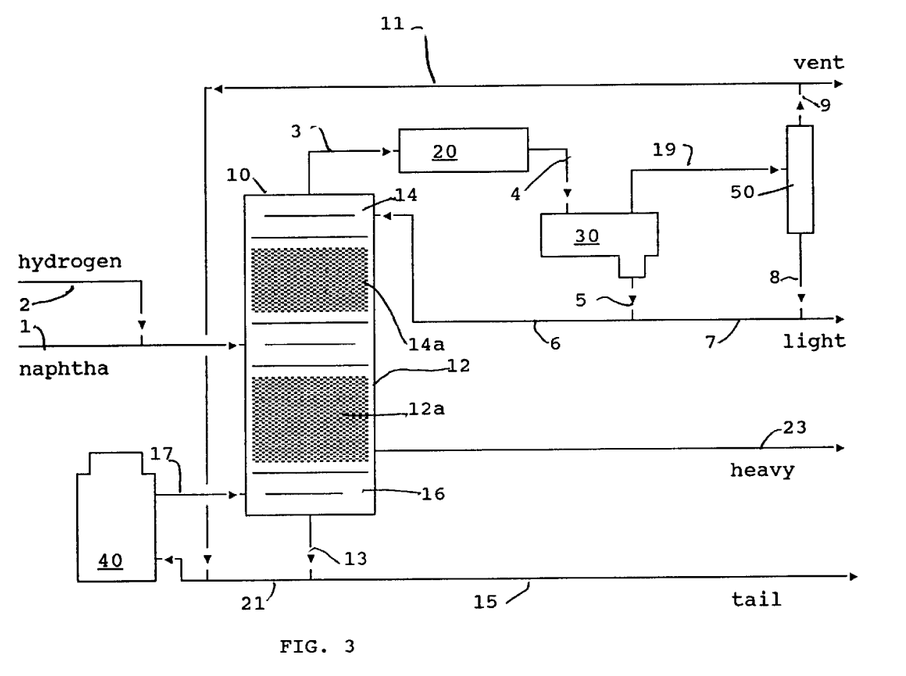
FIG. 3 is a simplified flow diagram of a variation of FIG. 2 having two catalyst beds in a distillation column/naphtha splitter which is used to treat the full boiling range naphtha and the heavy naphtha is withdrawn directly below the lowest catalyst bed.

A third embodiment is shown in FIG. 3 which differs only slightly from that shown in FIG. 2. The bottom most section 16 of the stripping section is left void of catalyst and the heavy naphtha product is withdrawn in a side draw via flow line 19. Most of the bottoms is recirculated through the reboiler 40 through flow line 21. A tail, which is higher boiling than the desired heavy fraction is otherwise taken as the bottoms via flow line 13 to prevent build up of heavies in the system. The advantage of this process is that the highest boiling material containing refractory sulfur compounds is removed in the tail.

Figure 4:
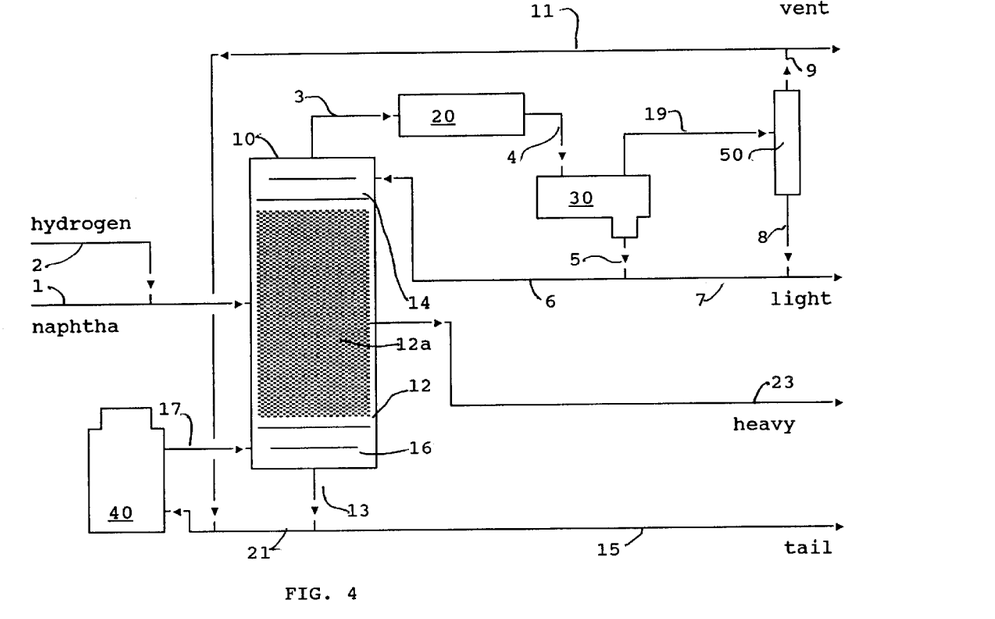
FIG. 4 is a simplified flow diagram of a variation of the embodiment of FIG. 3 having a continuous catalyst bed in a distillation column/naphtha splitter which is used to treat the full boiling range naphtha and the heavy naphtha is withdrawn at a point higher in the column than in FIG. 3.

Referring now to FIG. 4. a process similar to FIG. 3 is shown. There catalyst bed 12a is now continuous between the stripping section 12 and the rectification section 14. The heavy naphtha is withdrawn as a side draw via flow line 23 from directly below the rectification section. Like FIG. 3, a tail is withdrawn as bottoms via flow line 13 to prevent build up of heavies and remove the refractory sulfur compounds.

Figure 5:
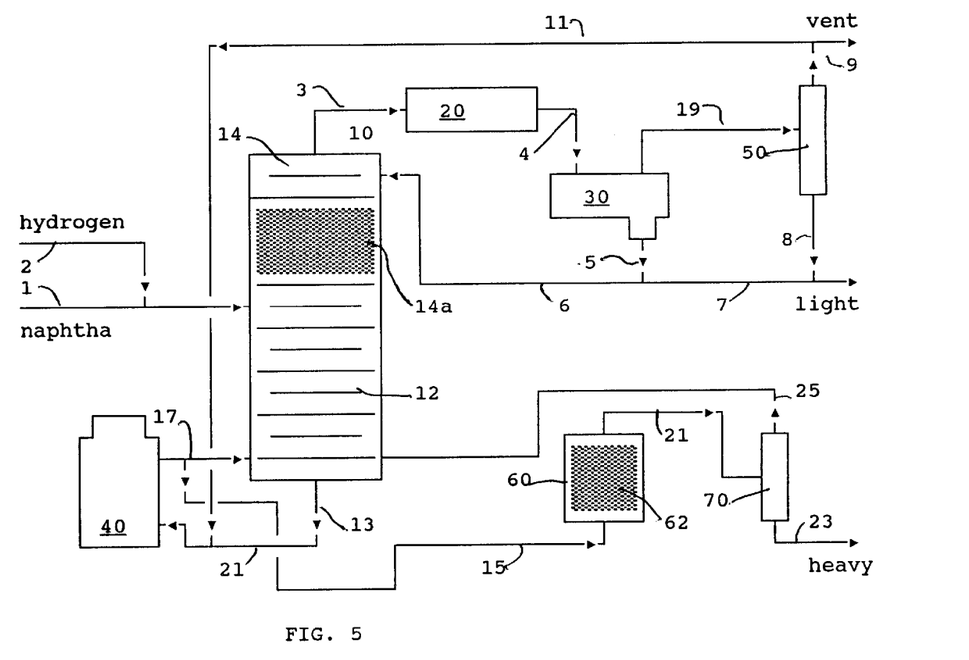
FIG. 5 is a simplified flow diagram of an embodiment of the invention wherein there is a single catalyst bed in the rectification section of a distillation column/naphtha splitter which is used to treat the light naphtha only and the heavy naphtha is treated in a conventional reactor.

FIG. 5 shows an embodiment useful when the sulfur content of the heavy fraction is such that it needs treating at significantly different conditions than available in the splitter. The catalyst bed 14a is placed in the rectification section 14 with the stripping section 12 left void. The feed is directly below the rectification section 14. The bottoms product from the heater 40 not recirculated to the column is fed to a single pass fixed bed reactor 60 containing a hydrodesulfurization catalyst bed 62. The effluent is passed to a high pressure separator 70 where the heavy naphtha is withdrawn via flow line 23. The vapor from the high pressure separator is recycled to the stripping section 12 via flow 25.

Figure 6:
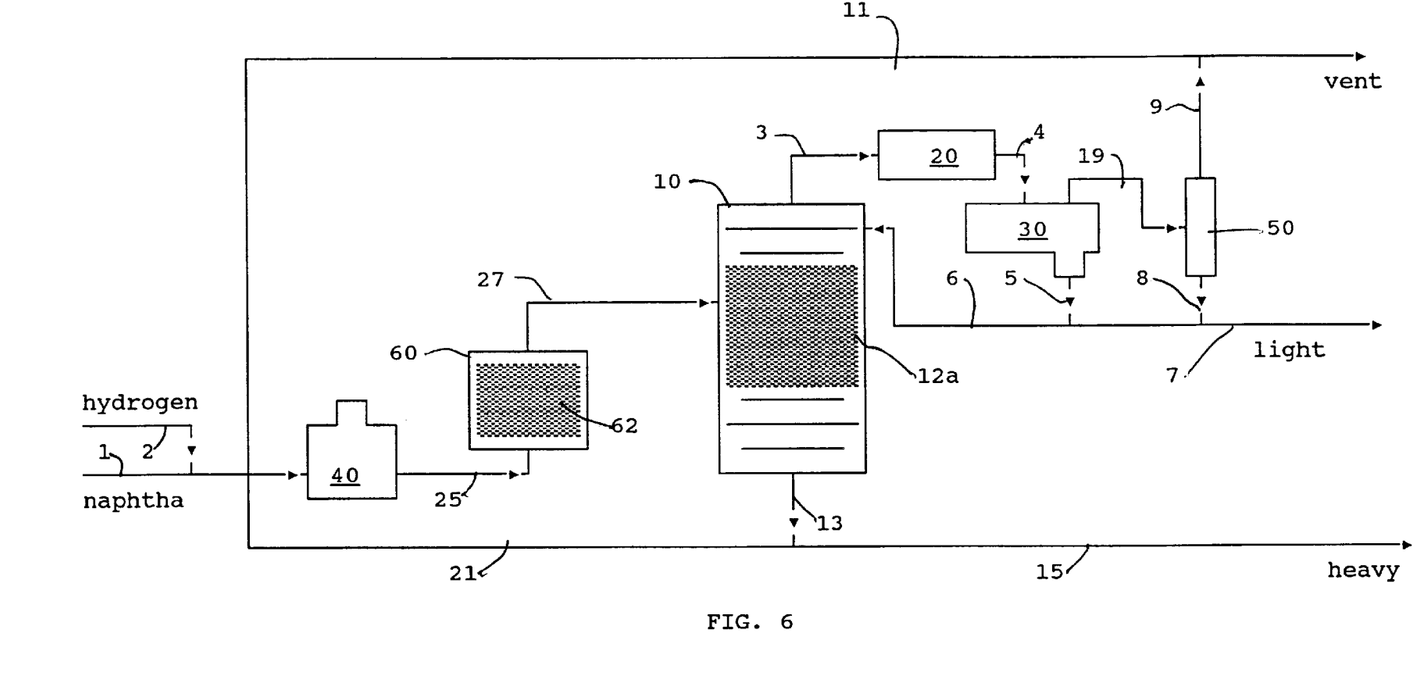
FIG. 6 is a simplified flow diagram of another embodiment of the invention wherein a front end conventional reactor is used as a guard bed for the distillation column/naphtha splitter which is used to treat the full range naphtha.

In FIG. 6 the single pass fixed bed reactor 60 containing the catalyst bed 62 is placed upstream of the distillation column reactor 10. In this case the distillation column reactor 10 acts as polishing reactor and the fixed bed reactor 60 can act as a guard bed. The guard bed reactor may be more easily reloaded with the hydrodesulfurization catalyst or regenerated than the distillation column reactor 10.

Figure 7:
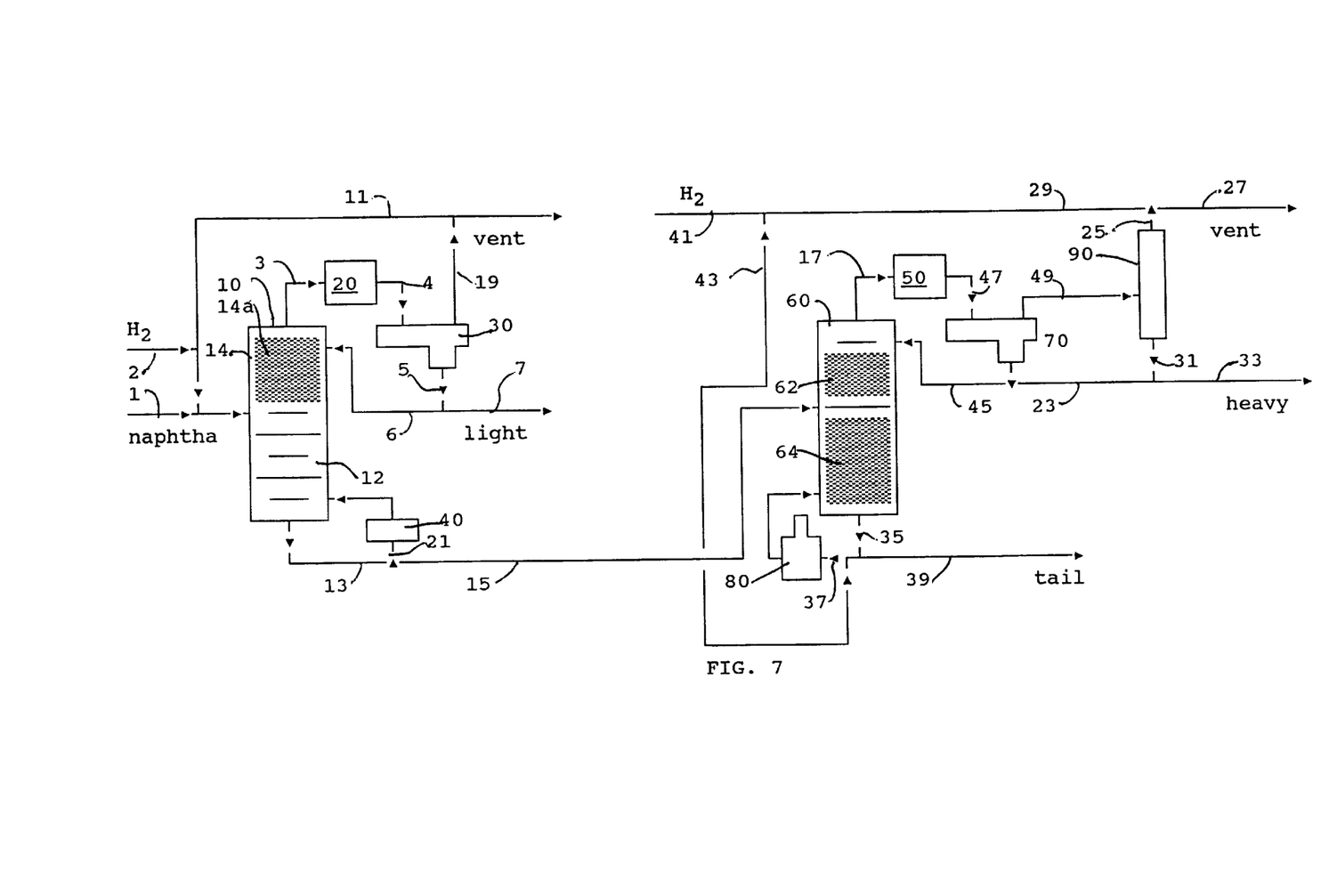
FIG. 7 is a simplified flow diagram of an embodiment similar to that of FIG. 5 wherein the distillation column/naphtha splitter is used to treat the light naphtha only and the heavy naphtha is treated in a separate distillation column reactor.

FIG. 7 discloses a process similar to that shown in FIG. 5 except the finishing reactor 60 for the bottoms heavy naphtha stream is a second distillation column reactor 60 with two bed of catalyst 62 and 64. The heavy naphtha bottoms from the first distillation column reactor 10 is fed to the second distillation column reactor 60 below the rectification section bed 62 and above the stripping section bed 64 via flow line 15. Hydrogen for the second distillation column reactor 60 is added to the recycle gas stream 29 via flow line 41 to make a combined stream in flow line 43. The second distillation column reactor 60 includes all of the auxiliary equipment that the first distillation column reactor 10 has including a condenser 50, a receiver/separator 70, a knock out pot 90 and a fired reboiler 80. The heavy naphtha product is taken as overheads via flow line 17 to condenser, thence to receiver/separator 70 via flow line 47 and removed from the receiver/separator via flow line 23 and combined with knock out pot liquid from flow line 31 into product line 33. The gas from receiver/separator 70 is taken via flow line 49 to knockout pot 90 where any liquid is removed via flow line 31 prior to recompression and recycle via flow line 25 and 29. A small vent 27 is taken to prevent build up of inerts in the system. Most of bottoms is combined with the recycle hydrogen in flow line 37 and recirculated through the fired reboiler 80. A tail product is removed via flow lines 35 and 39 to prevent build up of heavies in the system. The preferred operating conditions for the two distillation column reactors of FIG. 7 are as follows:

|  | Tower 1 (10) | Tower 2 (60) |
| --- | --- | --- |
| Pressure | 25–125 psig | 100–3000 psig |
| $H_2$ rate | 30–300 scfb | 30–1000 scfh |
| $H_2$ partial press. | 0.5–10 psi | 1–60 psi |
| % HDS | 85–95 (OH's) | 50–98 |
| WHSV | 0.2–5.0 | 0.2–5.0 |

Figure 8:
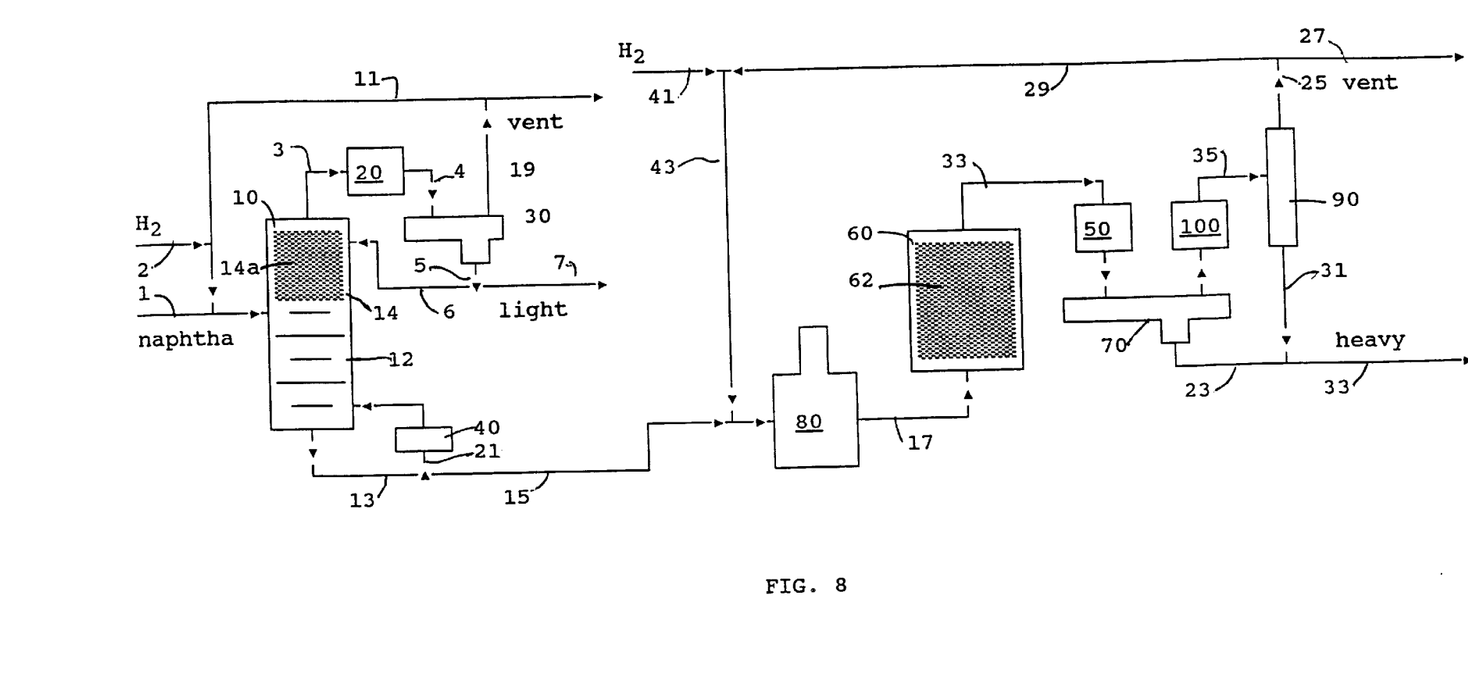
FIG. 8 is a simplified flow diagram of an embodiment similar to FIG. 5 wherein the distillation column/naphtha splitter is used to treat the light naphtha only and the heavy naphtha is treated in a conventional reactor.

The process shown in FIG. 8 is also similar to that of FIG. 5 except that feed to the single pass fixed bed reactor is heated in its own fired heater 80. The effluent from the reactor 60 is taken via flow line 33 to condenser 50 and thence to receiver/separator 70 when the liquid is withdrawn via flow line 23. The gas from receiver/separator is taken via flow line 35 and further cooled in cooler 100 before being pass on to knock out pot 90. The vapor from the knock out pot is taken via flow line 25 and most is recycled via flow line 29. Hydrogen is added to the recycle as needed via flow line 41 and the combined stream fed to the fired heater via flow line 43. The liquid from the knock out pot is taken via flow line 31 and combined with the heavy naphtha product in flow line 23 and removed via flow line 33.

Figure 9:
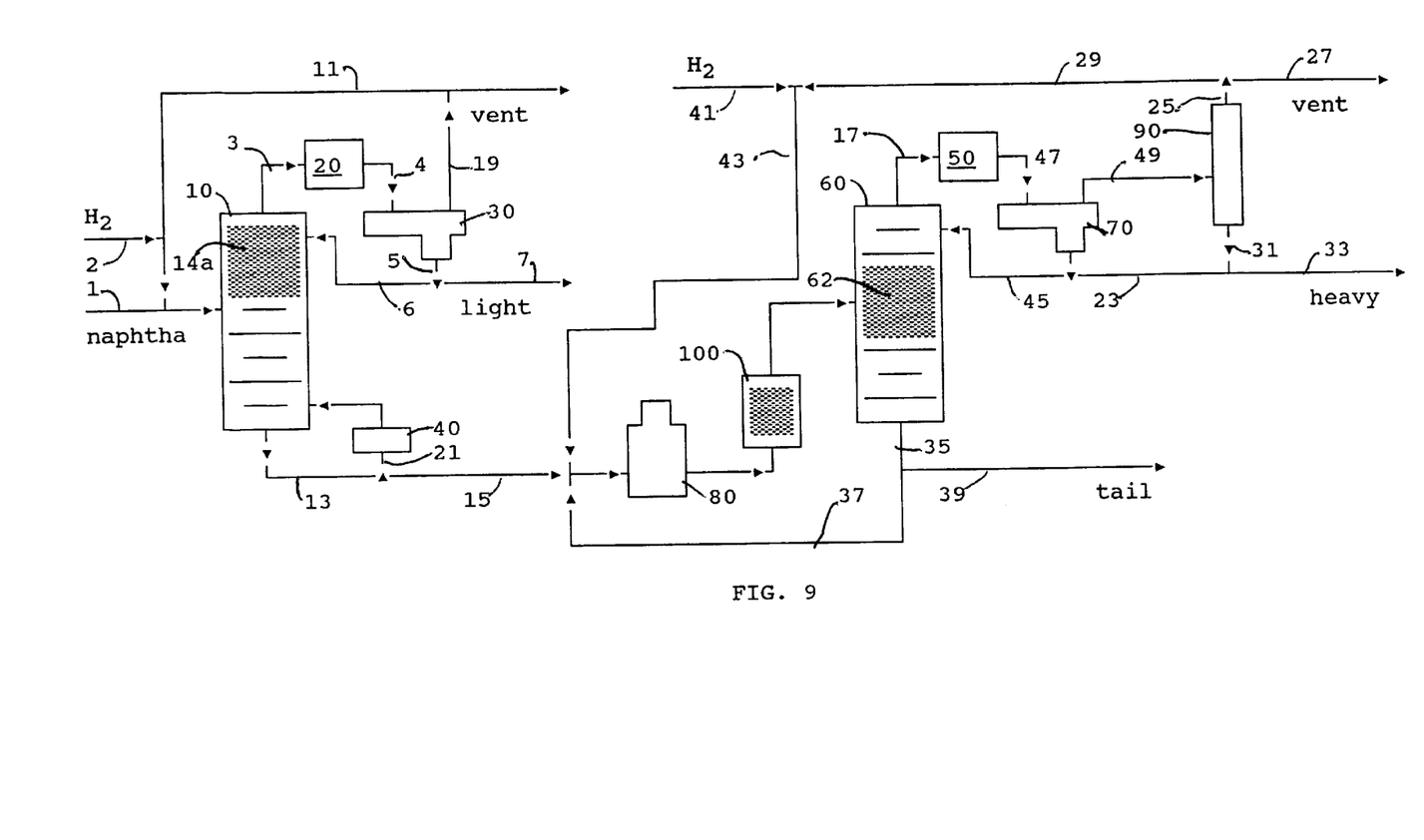
FIG. 9 is a simplified flow diagram of a variation of the embodiment of FIG. 8 wherein the distillation column/naphtha splitter is used to treat the light naphtha only and the heavy naphtha is treated in a separate distillation column reactor having a conventional guard bed with the bottoms from the separate distillation column reactor being recycled through the guard bed.

FIG. 9 shows a variation on the process of FIG. 8 which includes a fixed bed reactor 100 acting as a guard bed in the front of the second distillation column reactor 60 having all of the necessary auxiliary equipment including overhead condenser 50, receiver/separator 70 and knock out pot 90. The fired heater 80 for the single pass fixed bed reactor 100 acts as the reboiler for the distillation column reactor taking a potion of the bottoms in flow line 35 and recirculating them via flow line 37. A tail is taken via flow line 39 to prevent build up of heavies in the system. The heavy naphtha product is taken as overheads from the second distillation column reactor 60 via flow line 17 and condensed in condenser 50 and collected in receiver/ separator 70. The gas from the receiver/separator is taken via flow line 49 to knock out pot 90 to remove any liquids contained therein. Most of the gas from the knock out pot in line 25 is recycled via flow lie 29. A small portion is vented via flow line 27 to prevent buildup of inerts. A portion of the heavy naphtha product is returned as reflux via flow line 45. Liquid is taken from the knock out pot 900 via flow line 31 and combined with the heavy naphtha product in flow line 23 and removed via flow line 33. Make up hydrogen is added as needed via flow line 41 and combined with the recycle in flow line 43 and fed to the heater 80.

Figure 10:
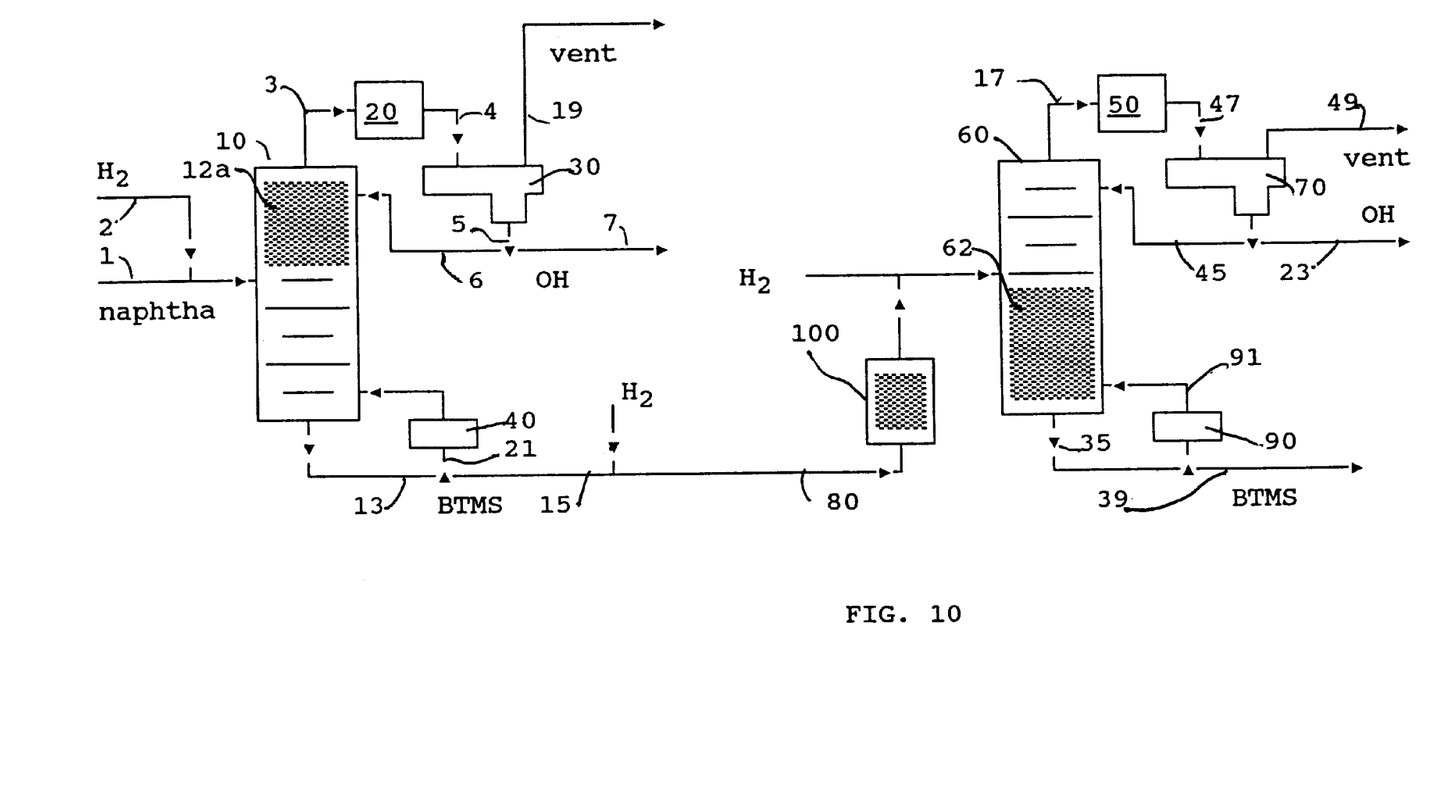
FIG. 10 is a simplified flow diagram of an alternative embodiment of the invention similar to that of FIG. 9 wherein the distillation column/naphtha splitter is used to treat the light naphtha only and the heavy naphtha is treated first in a guard bed reactor and then finished in a separate distillation column reactor.

Referring now to FIG. 10 a process similar to that shown in FIG. 9 is shown. There is no recycle of any of the overhead vapors, however. The second distillation column reactor 60 has its bed of catalyst 62 located only in the stripping zone to treat only the heaviest of the heavy naphtha.

Figure 11:
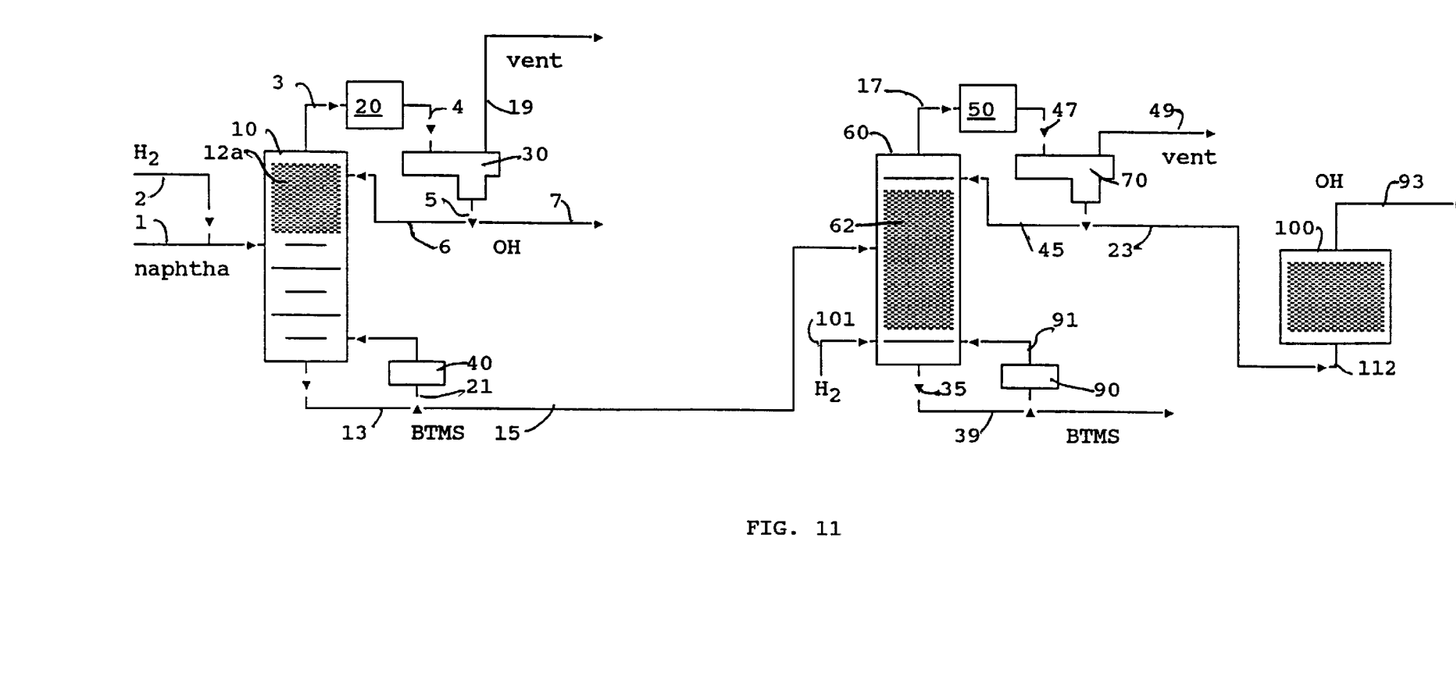
FIG. 11 is a simplified flow diagram of another embodiment of the invention wherein the distillation column/naphtha splitter is used to treat the light naphtha only and the heavy naphtha is treated in a separate distillation column reactor with the overheads from the separate distillation column being finished in a standard single pass reactor.

A final embodiment is shown in FIG. 11 which is also similar to that shown in FIG. 7 except that the overheads from the second distillation column reactor are further treated in a standard single pass fixed bed reactor 100 containing a bed of catalyst 112 which now serves as a finishing reactor.

In many of the embodiments the hydrogen is recycled back to the reactors. Vents may be sufficient to maintain the $H_2S$ levels low enough for the reaction. However, if desired, the recycle gas may be scrubbed using conventional methods to remove the $H_2S$.

The invention presents a flexible arrangement for treating various naphthas utilizing a distillation column reactor/ naphtha splitter and auxiliary reactors.

The invention claimed is:

1. A process for the hydrodesulfurization of naphtha in a distillation column reactor having a stripping section and a rectification section, comprising the steps of:
    (a) feeding a naphtha boiling range hydrocarbon stream containing organic sulfur compounds and hydrogen to a distillation column reactor above said stripping section;
    (b) concurrently in said distillation column reactor
        (i) separating said naphtha into a light boiling range naphtha and a heavy boiling range naphtha
        (ii) contacting the heavy boiling range naphtha and hydrogen with a hydrodesulfurization catalyst in said stripping section to selectively react the heavier organic sulfur compounds with said hydrogen to form $H_2S$;
    (c) removing said light boiling range naphtha, $H_2S$ and unreacted hydrogen from said distillation column reactor as overheads;
    (d) removing said heavier boiling range naphtha from said distillation column reactor as bottoms.

2. The process according to claim 1 further comprising the steps of:
    (e) cooling said overheads to condense said light boiling range naphtha and separate it from said hydrogen and $H_2S$;
    (f) returning a portion of said condensed light boiling range naphtha to said distillation column reactor as reflux;
    (g) recirculating a portion of said bottoms through a reboiler; and
    (h) feeding said unreacted hydrogen from said overheads to said reboiler for recirculation back to said distillation column reactor at a point below said stripping section.

3. The process according to claim 1 further comprising the steps of:
    (b) contacting the light boiling range naphtha and hydrogen with a hydrodesulfurization catalyst in said rectification section to selectively react the lighter organic sulfur compounds with said hydrogen to form $H_2S$;
    (i) recirculating a portion of said bottoms through a reboiler; and
    (j) feeding said unreacted hydrogen from said overheads to said reboiler for recirculation back to said distillation column reactor at a point below said stripping section.

4. The process according to claim 3 further comprising the steps of:
    (g) cooling said overheads to condense said light boiling range naphtha and separated it from said hydrogen and $H_2S$; and
    (h) returning a portion of said condensed light boiling range naphtha to said distillation column as reflux.

5. The process according to claim 3 wherein the lower portion of said stripping is void of said hydrodesulfurization catalyst and a side stream is taken from said stripper section at a point just below said hydrodesulfurization catalyst located in said stripper section.

6. The process according to claim 4 wherein the lower portion of said stripping is void of said hydrodesulfurization catalyst and a side stream is taken from said distillation column reactor at a point just below said rectification section.

7. A process for the hydrodesulfurization of naphtha in a distillation column reactor having a stripping section and a rectification section, comprising the steps of:
    (a) feeding a naphtha boiling range hydrocarbon stream containing organic sulfur compounds and hydrogen to a distillation column reactor above said stripping section;
    (b) concurrently in said distillation column reactor
        (i) separating said naphtha into a light boiling range naphtha and a heavy boiling range naphtha
        (ii) contacting the light boiling range naphtha and hydrogen with a hydrodesulfurization catalyst in said rectification section to selectively react the lighter organic sulfur compounds with said hydrogen to form $H_2S$;
    (c) removing said light boiling range naphtha, $H_2S$ and unreacted hydrogen from said distillation column reactor as overheads;

(d) removing said heavier boiling range naphtha from said distillation column reactor as bottoms;
(e) feeding said unreacted hydrogen from said overheads to a reboiler for recirculation back to said distillation column reactor at a point below said stripping section; and
(f) feeding a portion of the effluent from said reboiler to a fixed bed single pass reactor containing a hydrodesulfurization catalyst to react a portion of the heavy organic sulfur compounds with hydrogen to form $H_2S$.

8. The process according to claim 7 further comprising the steps of:
(g) cooling said overheads to condense said light boiling range naphtha and separated it from said hydrogen and $H_2S$;
(h) returning a portion of said condensed light boiling range naphtha to said distillation column as reflux; and
(i) recirculating a portion of said bottoms through a reboiler.

9. The process according to claim 7 wherein the effluent from said fixed bed single pass reactor is separated into a gaseous portion containing unreacted hydrogen and said $H_2S$, and a liquid portion containing said heavy boiling naphtha, and said gaseous portion is recycled to said distillation column reactor below said stripping section.

10. The process according to claim 7 further comprising the steps of:
(f) feeding the remainder of said bottoms and additional hydrogen to a fixed bed single pass reactor containing a hydrodesulfurization catalyst to react a portion of the heavy organic sulfur compounds with hydrogen to form $H_2S$.
(g) cooling said overheads to condense said light boiling range naphtha and separating it from said hydrogen and $H_2S$;
(h) returning a portion of said condensed light boiling range naphtha to said distillation column as reflux; and
(i) recirculating a portion of said bottoms through a reboiler.

11. The process according to claim 10 further comprising the steps of:
(j) feeding the effluent from said single pass fixed bed reactor into a second distillation column reactor;
(k) concurrently in said second distillation column reactor,
  (i) contacting the heavy boiling range naphtha and hydrogen with a hydrodesulfurization catalyst to further react the additional organic sulfur compounds with said hydrogen to form $H_2S$; and
  (ii) separating said heavy boiling range naphtha into a heavy naphtha stream and a tail stream;
(l) removing said heavy naphtha stream, $H_2S$ and unreacted hydrogen from said second distillation column reactor as overheads;
(m) removing said tail stream from said second distillation column reactor as bottoms;
(n) cooling said overheads to condense said heavy naphtha stream and separated it from said hydrogen and $H_2S$;
(o) returning a portion of said condensed heavy naphtha stream to said second distillation column as reflux;
(p) recirculating a portion of said heavier boiling range naphtha through said single pass fixed bed reactor;
(q) recycling said unreacted hydrogen from said overheads to said single pass fixed bed reactor with said naphtha feed.

12. The process according to claim 10 further comprising the steps of:
(j) feeding the effluent from said single pass fixed bed reactor into a second distillation column reactor;
(k) concurrently in said second distillation column reactor,
  (i) separating said heavy boiling range naphtha into a heavy naphtha stream and a tail stream; and
  (ii) contacting the heavy boiling range naphtha and hydrogen with a hydrodesulfurization catalyst in the rectification section of said second distillation column reactor to further react the additional organic sulfur compounds with said hydrogen to form $H_2S$; and
(l) removing said heavy naphtha stream, $H_2S$ and unreacted hydrogen from said second distillation column reactor as overheads;
(m) removing said tail stream from said second distillation column reactor as bottoms;
(n) cooling said overheads to condense said heavy naphtha stream and separated it from said hydrogen and $H_2S$;
(o) returning a portion of said condensed heavy naphtha stream to said second distillation column as reflux;
(p) recirculating a portion of said heavier boiling range naphtha through said single pass fixed bed reactor;
(q) recycling said unreacted hydrogen from said overheads to said single pass fixed bed reactor with said naphtha feed.

13. A process for the hydrodesulfurization of naphtha comprising:
(a) feeding hydrogen and naphtha into a single pass fixed bed reactor containing a hydrodesulfurization catalyst to thereby react a portion of the organic sulfur compounds contained therein with hydrogen to form $H_2S$;
(b) feeding the effluent from said single pass fixed bed reactor into a distillation column reactor;
(c) concurrently in said distillation column reactor:
  (i) contacting the full boiling range naphtha and hydrogen with a hydrodesulfurization catalyst to further react the additional organic sulfur compounds with said hydrogen to form $H_2S$; and
  (ii) separating said naphtha into a light boiling range naphtha and a heavy boiling range naphtha;
(d) removing said light boiling range naphtha, $H_2S$ and unreacted hydrogen from said distillation column reactor as overheads;
(e) removing said heavier boiling range naphtha from said distillation column reactor as bottoms;
(f) cooling said overheads to condense said light boiling range naphtha and separated it from said hydrogen and $H_2S$;
(g) returning a portion of said condensed light boiling range naphtha to said distillation column as reflux;
(h) recirculating a portion of said heavier boiling range naphtha through said single pass fixed bed reactor;
(h) recycling said unreacted hydrogen from said overheads to said single pass fixed bed reactor with said naphtha feed.

14. A process for the hydrodesulfurization of naphtha in a distillation column reactor having a stripping section and a rectification section, comprising the steps of:
(a) feeding a naphtha boiling range hydrocarbon stream containing organic sulfur compounds and hydrogen to said distillation column reactor above said stripping section;

(b) concurrently in said distillation column reactor
   (i) separating said naphtha into a light boiling range naphtha and a heavy boiling range naphtha;
   (ii) contacting the light boiling range naphtha and hydrogen with a hydrodesulfurization catalyst in said rectification section to selectively react the lighter organic sulfur compounds with said hydrogen to form $H_2S$;
(c) removing said light boiling range naphtha, $H_2S$ and unreacted hydrogen from said distillation column reactor as overheads;
(d) removing said heavier boiling range naphtha from said distillation column reactor as bottoms;
(e) cooling said overheads to condense said light boiling range naphtha and separated it from said hydrogen and $H_2S$;
(f) returning a portion of said condensed light boiling range naphtha to said distillation column reactor as reflux;
(g) recirculating a portion of said heavier boiling range naphtha through a reboiler;
(h) recycling said unreacted hydrogen from said overheads to said distillation column reactor with said naphtha feed; and
(i) feeding the remainder of said heavier boiling range naphtha and additional hydrogen to a second distillation column reactor;
(j) concurrently in said second distillation column reactor:
   (i) separating said heavier boiling range naphtha into a heavy naphtha stream and a tail stream; and
   (ii) contacting the heavy boiling range naphtha and hydrogen with a hydrodesulfurization catalyst section to react the heavier organic sulfur compounds with said hydrogen to form $H_2S$;
(k) removing said heavy naphtha stream, $H_2S$ and unreacted hydrogen from said second distillation column reactor as overheads; and
(l) removing said tail stream from said second distillation column reactor as bottoms.

* * * * *